United States Patent Office 3,091,271
Patented May 28, 1963

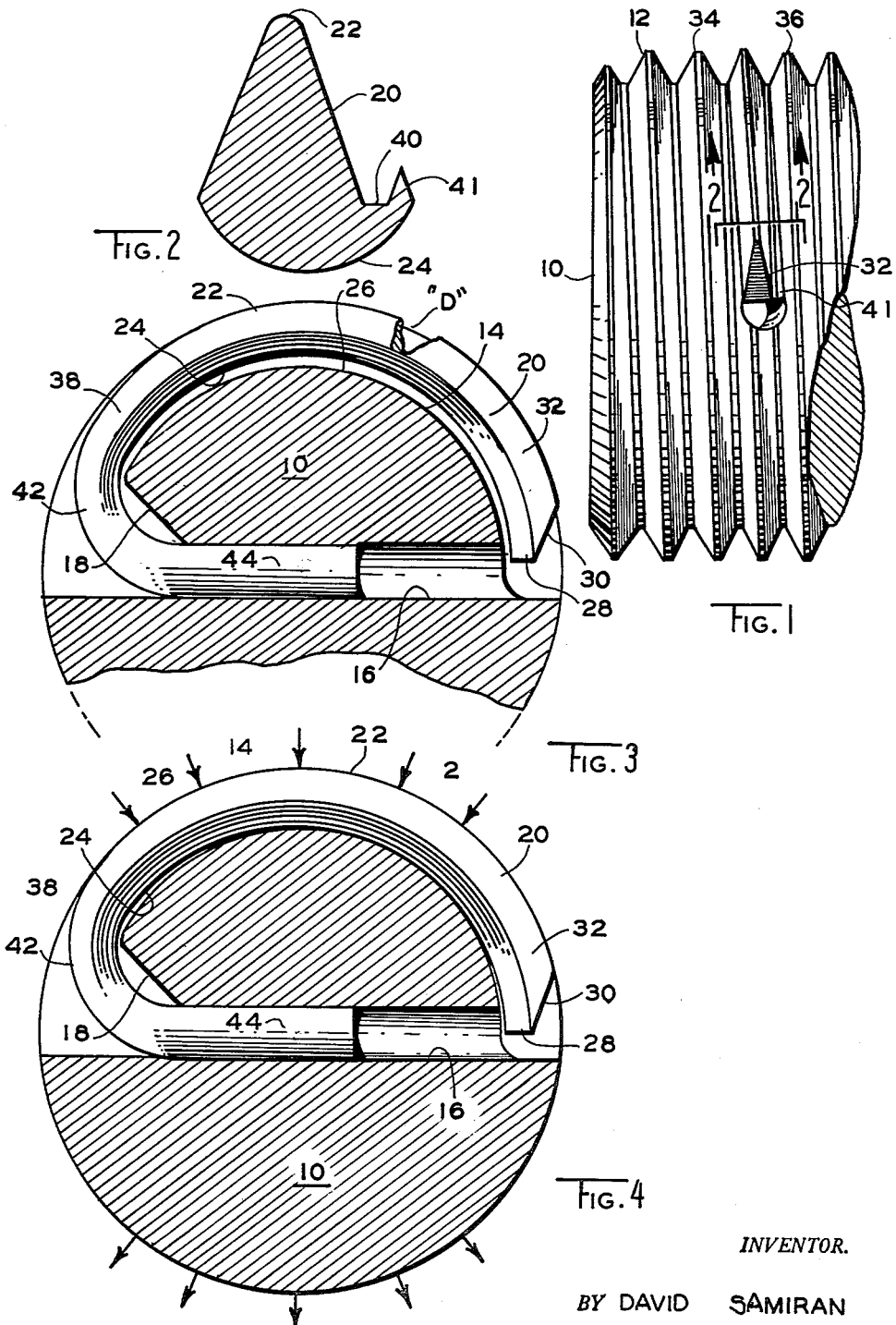

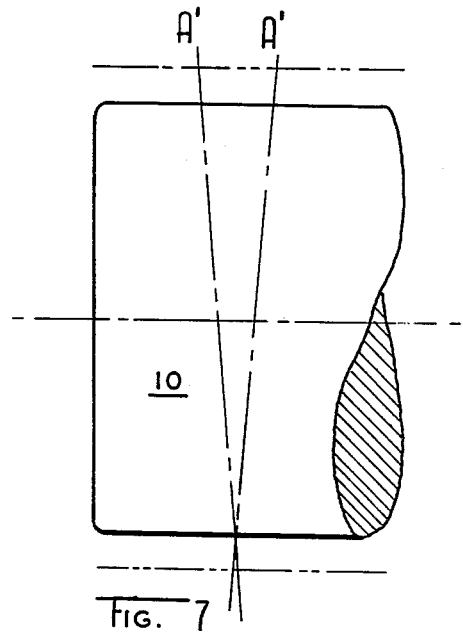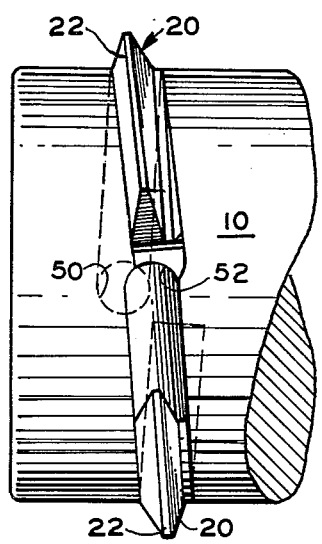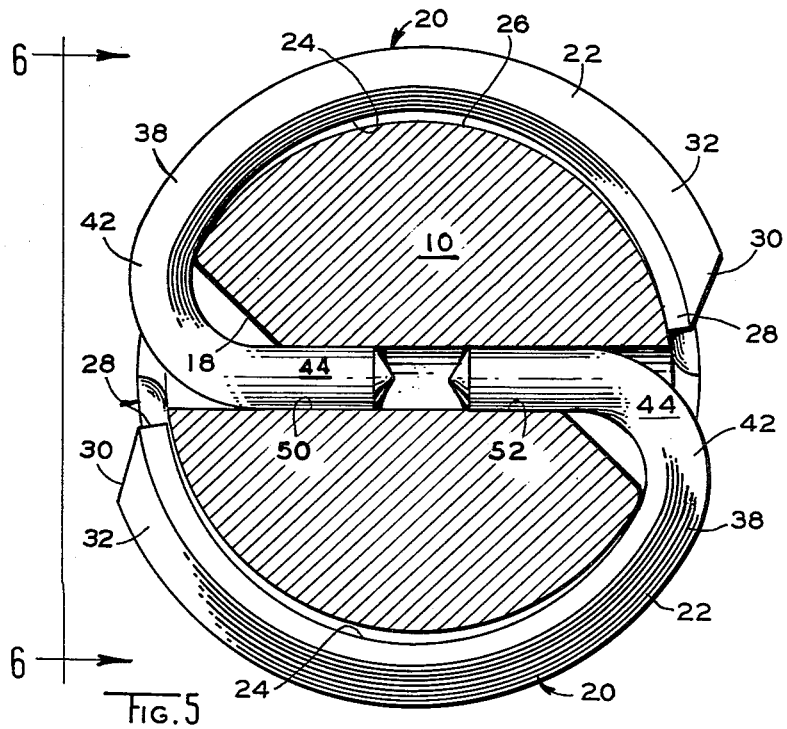

3,091,271
SELF-LOCKING THREADED FASTENER HAVING A RESILIENT WIRE LOCKING MEMBER
David Samiran, 51 Mercury Court, West Springfield, Mass.
Filed June 27, 1960, Ser. No. 39,115
2 Claims. (Cl. 151—25)

This invention relates to a self-locking threaded connection and is suitable for locking bolts and the like within their companion threaded means such as a nut, threaded through opening or threaded blind opening. The invention is also usable in forming a locking connection for a non-threaded member in which the locking means itself is the only threaded connection with a companion nut or the like.

Reference is made to co-pending application Serial No. 819,263, filed June 10, 1959, now abandoned, wherein there is disclosed and claimed a related self-locking means, of which the present application is a continuation-in-part and the present invention forms an improvement. Specifically, it is one of the objects of the present invention to provide a self-locking threaded connection wherein the locking means effects frictional resistance to unthreading movement and further provides a cocking effort on the threaded members which serves to bind the threads against each other thereby increasing the resistance to unthreaded movement.

A further object of the invention is to provide a self-locking member having an integral portion which is co-operative with the threads of its opposed companion threaded member to prevent damage to the locking member or nut-bolt combination during movement in an unthreading direction. It is intended that the foregoing shall be accomplished by novel additions to the locking member.

A further object of the invention is to provide an improved mounting for the locking member on its carrier which is generally, but not necessarily, a bolt.

Other objects and features of the invention will become apparent from a consideration of the following description which proceeds with reference to the accompanying drawings, wherein a plurality of embodiments of the invention are disclosed by way of example.

In the drawings:

FIGURE 1 is a fragmentary side view of the threaded portion of a bolt or the like fastener and having the locking member of the present invention provided therein;

FIGURE 2 is a cross sectional view of the wire locking member, a section view being taken on line 2—2 of FIGURE 1;

FIGURE 3 is a fragmentary sectional view taken transversely through the threaded member shown in FIGURE 1, the locking member being shown in its expanded position;

FIGURE 4 is a view similar to FIGURE 3 but showing the wire locking member as it is compressed when the threaded member is screwed within a companion threaded means, the arrows indicating the radial forces developed;

FIGURE 5 illustrates a second embodiment of the invention in which the locking means forms the sole threaded connection;

FIGURE 6 is a side view of the structure shown in FIGURE 5 and looking in the direction of the arrows 6—6 in FIGURE 5; and, FIGURE 7 is a view similar to FIGURE 6 but with the locking members shown removed and illustrating the direction of forming the radial openings for mounting the locking members.

Referring now to the embodiment shown in FIGURES 1 to 4, a bolt 10 having threads 12 is formed with a recess 14 (FIGURE 3) constituted by removal of a continuous portion of one of said threads over an arc of approximately 180°, the length of the thread removed being of course along a helical path so that the remainder of the threads are undisturbed. A passage 16 is drilled through the diameter of the bolt 10 and it is formed at an angle through the longitudinal axis of the bolt at the pitch angle of the threads so that the passage 16 terminates at its opposite ends along the helical path of the removed thread portion. The passage 16 thus extends between the crest of one thread and the crest of its succeeding thread.

Where the passage 16 intersects recess 14 at one side thereof is an enlarged portion 18 which is formed by angularly tapering the radial passage 16.

A wire locking member 20 is proportioned to fit within recess 14 and has an outer edge 22 which extends in its uncompressed state beyond the thread diameter of the bolt 10. The amount of extension of the edge 22 beyond the thread diameter varies along the arcuate length of the locking member 20 and the maximum extension of the outer edge 22 beyond the thread diameter is indicated by the distance "D" in FIGURE 3 where a portion of the locking member is broken away to illustrate this extension.

The inner edge 24 of the locking member is rounded and has a clearance from the base 26 of the recess 14, this clearance being proportioned around the length of the locking member so that the locking member can be biased inwardly bringing the outer edge 22 into conformity with the thread diameter of the bolt 10 when the bolt is threaded in place.

The unsupported extremity 28 of the locking member is tapered at 30 so that it will not gouge or bite into the opposed companion threaded member (not shown) when the bolt is threaded in place. The cross sectional width of the locking member at 32 is narrower than the width of the adjacent threads 34 and 36 so that the locking member can effect a cocking action on the bolt 10 in a manner to be described. The locking member is also reduced in width at 38 the same as described at 32.

A tapered lip 40 having an upwardly turned flange 41 is constructed along an edge of the locking member 20 and is of a maximum width at extremity 28 and tapers to zero dimension along the length of the locking member 20. The lip 40 is disposed so that it forms the base in the threaded connection. The flange 41 and lip 40 is engaged by the crest of the opposed threaded member to depress the extremity 28 and prevent its scoring or damaging the opposed threads of the companion locking member when the bolt is being removed or screwed in the reverse direction.

Within the enlarged portion 18 of the passage 16 the locking member 20 forms a smooth bend section 42 which is constructed with a radius providing a gradual merging continuation of the arcuate portion of the locking member.

Within the passage 16, there is fitted a straight end portion 44 of the wire locking member 20 by which the locking member is secured to the bolt 10 and is rotated therewith in either clockwise or counterclockwise direction.

In operation, the wire locking member is first installed by forcing the portion 44 within passage 16 to mount the locking member against movement relatively with the bolt 10. The locking member in its uncompressed state is shown in FIGURE 3 wherein the outer edge 22 extends slightly beyond the major diameter of the bolt, the outer edge 22 forming a continuation of the threads as shown in FIGURE 1. There is a slight gap in the threaded connection to provide for the locking member, as can be seen from FIGURE 3, but the discontinuity is slight and is of an amount so that the strength of the threaded connection is not materially affected. The bolt 10 is then threaded within a companion locking member and as the threads 12 advance into the companion threaded means, such as a nut (not shown), the outer edge 22 of the locking member is biased downwardly and the tendency for the locking member to return from its condition shown in FIGURE 4 to that of FIGURE 3 produces a "friction shoe" binding effect between the outer edge 22 of the locking member and its opposed threads. The radial reaction force of the threads indicated by the arrows in FIGURE 4 creates a binding effect which resists unthreading movement of the bolt 10. The biasing effort exerted against the locking member 20 is communicated through the bolt to its opposite side giving rise to the radial forces indicated at the bottom half of FIGURE 4 by which the threads of the bolt are biased against the threads of the companion locking member as indicated.

Since the locking member 20 follows a segment of the helical path of the threads (this is so because the locking member replaces a removed portion of the thread), the binding effect of the locking member 20 reacts against the threads of the companion locking member on each side of the locking member 20. As previously mentioned, the locking member 20 is proportioned to be at points 32 and 38 of reduced cross section and therefore can twist slightly between threads 34 and 36 (FIGURE 1) and thereby develop, by engagement with the threads received in the troughs between 34 and 36, a cocking effort on the bolt 10 by which the bolt 10 is cocked askew within its threaded opening thereby creating further binding effect resisting unthreading movement.

When it is desired to remove the bolt, it is rotated in an unthreading direction and while such movement is resisted by the locking member such unthreading movement will produce damage to either the locking member or the nut and bolt combination. The extremity 28 of the locking member 20 is tapered, or it can be rounded, so that it will not gouge into the opposing threads during installation or removal of the bolt and nut combination. Also, at the extremity 28, the flange 41 and lip 40 is in contact with the opposing threads so that lateral or sidewise movement of the locking member 20 is prohibited because the end 28 is depressed radially inwardly by virtue of engagement of lip 40 with the opposing threads.

It will be understood that the invention is not limited to a specific thread shape or pitch, size or degree of fineness of threaded connection. The locking member need only conform approximately in outer surface shape with the thread portion which it has replaced to be a continuation of the helical threads, and by decreasing the length of the wire, the torque required to remove the bolt will be decreased because of less frictional forces.

A further modification is that shown in FIGURES 5-7 wherein the locking member constitutes the sole threaded connection. In this instance, there are two locking member 20 which are substantially of the same construction as that described in the previous invention but each is received within a distinct radial passage 50 and 52. The center line of openings 50 and 52 are at an angle with respect to each other on axes A and A' in FIGURE 7, the angularity of these axes corresponds to the pitch of the thread connection defined by the locking members which define a discontinuous helical path suitable for screwing within a companion threaded means.

The bolt 10 is unthreaded as shown in FIGURES 5 and 6 and the sole threaded means is provided by the two locking members 20. The two locking members 20 are shown in their free or uncompressed state in FIGURE 5 but are compressed radially inwardly to positions corresponding to that of the locking member in FIGURE 4 and the radial forces developed by the locking members 20 in FIGURE 5 are the same as that described in FIGURE 4. Likewise, lateral forces are developed by each locking member 20 along its helical length, against the threads of the companion locking member on each side of the locking members 20. Thus lateral forces are communicated to the bolt 10 as a cocking force which tends to bias the bolt 10 in a skewed direction within the companion opening thus creating additional frictional resistance against unthreading movement.

In this embodiment it will be appreciated that the locking members 20 perform the dual function of connecting the bolt 10 and locking the bolt against movement in an unthreading direction.

Although only two embodiments of the invention have been selected to illustrate the invention, it will be appreciated that those skilled in the art may make numerous adaptations and revisions as suit particular requirements. It is intended that such revisions and adaptations of the invention as incorporate the herein disclosed principles will be included within the scope of the following claims as equivalents of the invention.

What is claimed is:

1. A self-locking threaded fastener comprising a threaded stem, means forming a recess in an arc of substantially 180° within said stem and constituted by removal of a helically continuous thread portion, a resilient wire locking member generally complementary in cross section to said fastener thread and proportioned to fit within said recess and having an outer edge which extends slightly beyond the thread diameter of said threaded stem and an inner edge having a clearance from the base of said recess to provide radially inward biasing of said locking member as said threaded stem is screwed within a companion threaded member, said locking member forming a frictional connection with said companion threaded member and effecting an off-center skew force on said stem imposing binding effort on the threaded engagement of said fastener with its threaded member, a radial passage in said stem which is enlarged by angularly tapering the radial passage at its intersection with said recess, a smoothly bent portion of said locking member which curves inwardly toward the center of said threaded fastener to be disposed within the enlarged portion of said radial passage, an extension of said wire locking member received within said radial passage for fastening said locking member to said threaded fastener, and a trailing end portion of said locking member having an inclined face forming a clearance from the companion threaded member, said trailing end and smoothly bent portion of said locking member being of smaller width in cross section than the corresponding widths of its adjacent threads on said threaded fastener, a lip having a flange constructed integrally along one lateral side of said locking member at the extremity of said locking member and tapered to provide a maximum width at said extremity, said lip being disposed to define an upwardly turned crest which engages the threads of said companion threaded member to depress said extremity.

2. A self-locking threaded fastener comprising a threaded stem having an end adapted for holding the stem against turning, means forming a recess in the threaded portion of said stem and constituted by removal of substantially one convolution of a continuous thread portion, means forming a radial passage in said stem and extending into said stem at the pitch angle of said threads and intersecting said recess, said radial passage being enlarged by angularly tapering the radial passage at said intersection, a pair of resilient wire locking members proportioned to fit within said recess and each having an arcuate outer edge projecting slightly beyond the thread diameter and an inner edge displaced from said recess by an amount proportioned to provide radially inward biasing of each said locking member by the threading action of said fastener within its companion member, a lip having a flange constructed integrally along one lateral side of each said locking member at the extremity of each said locking member and tapered to provide a maximum width at said extremity, said lip being disposed to define an upwardly turned crest which engages the threads of said companion threaded member to depress said extremity, a trailing end portion for each locking member having an inclined face forming a clearance from the companion threaded member and means forming a hook for each wire received within said radial passage to effect a connection between said bolt and locking member.

References Cited in the file of this patent

UNITED STATES PATENTS

| 1,272,229 | Daly | July 9, 1918 |
| 1,316,731 | Lovejoy | Sept. 23, 1919 |
| 2,367,379 | Soldan | Jan. 16, 1945 |
| 2,376,768 | Glumer | May 22, 1945 |
| 2,654,410 | Proctor | Oct. 6, 1953 |